United States Patent
Labonte et al.

[11] Patent Number: 5,991,286
[45] Date of Patent: Nov. 23, 1999

[54] SUPPORT OF MULTIPLE MODULATION LEVELS FOR A CELLULAR PACKET CONTROL CHANNEL

[75] Inventors: Sylvain Labonte, St-Bruno de Montarville; Eric Turcotte, Verdun, both of Canada

[73] Assignee: Telefonaktiebolaget L M Ericsson (publ), Stockholm, Sweden

[21] Appl. No.: 08/801,386

[22] Filed: Feb. 20, 1997

[51] Int. Cl.⁶ .................................................. H04B 7/212
[52] U.S. Cl. ............................................ 370/337; 370/468
[58] Field of Search .................................... 370/328, 329, 370/330, 336, 337, 347, 348, 349, 442, 465, 468, 206, 207, 241, 251, 204, 208; 375/298, 308, 225, 226, 227, 358; 455/63, 67.1, 67.3, 226.1–3, 405

[56] References Cited

U.S. PATENT DOCUMENTS

| | | | |
|---|---|---|---|
| 5,239,667 | 8/1993 | Kanai | 455/10 |
| 5,327,576 | 7/1994 | Uddenfeldt et al. | 370/333 |
| 5,345,499 | 9/1994 | Benveniste | 455/449 |
| 5,392,453 | 2/1995 | Gudmundson et al. | 455/444 |
| 5,396,253 | 3/1995 | Chia | 455/441 |
| 5,396,645 | 3/1995 | Huff | 455/441 |
| 5,457,680 | 10/1995 | Kamm et al. | 370/332 |
| 5,491,832 | 2/1996 | Malkamaki et al. | 455/552 |
| 5,533,004 | 7/1996 | Jasper et al. | 370/442 |
| 5,577,087 | 11/1996 | Furuya | 375/377 |
| 5,701,294 | 12/1997 | Ward et al. | 370/337 |
| 5,719,859 | 2/1998 | Kobayashi et al. | 370/443 |
| 5,729,531 | 3/1998 | Raith et al. | 370/337 |
| 5,729,534 | 3/1998 | Jokinen et al. | 370/337 |
| 5,745,480 | 4/1998 | Behtash et al. | 370/333 |

FOREIGN PATENT DOCUMENTS

| | | |
|---|---|---|
| WO 92/12602 | 7/1992 | WIPO . |
| WO 92/22162 | 12/1992 | WIPO . |
| WO 95/07578 | 3/1995 | WIPO . |
| WO 96/05708 | 2/1996 | WIPO . |
| WO 97/15131 | 4/1997 | WIPO . |
| WO 97/44926 | 11/1997 | WIPO . |

OTHER PUBLICATIONS

Dunlop, J., et al. "Estimation of the Performance of Link Adaptation in Mobile Radio", IEEE RACE Mobile Telecommunications Summit, Nov. 22, 1995, pp. 326–330.

"A Summary of Cell Selection in Two–tier Microcellular/Macrocellular Systems", 5 pages, AT&T MSI, ETSI/STC/SMG2 Tdoc 161/92, date unknown.

Benveniste, M., "Cell Selection in Two–Tier Microcellular/Macrocellular Systems", 12 pages, AT&T Bell Laboratories, date unknown.

PCT Standard Search Report, Sep. 29, 1998, PCT/SE98/00197.

*Primary Examiner*—Chau Nguyen
*Assistant Examiner*—Soon-Dong Hyun
*Attorney, Agent, or Firm*—Jenkens & Gilchrist PC

[57] ABSTRACT

A D-AMPS+ cellular communications air interface is presented wherein a packet data control channel and packet data traffic channel is supported in addition to the conventional digital control channel and digital traffic channel. In particular, the packet data control channel and packet data traffic channel support multiple modulation level operation (high versus low). Procedures are provided for mobile station selection, as well as re-selection, of either the high or low-level modulation for the packet channels. Procedures are further provided for facilitating a fall-forward to the high-level modulation packet data control channel, or a fall-backward to the low-level modulation packet data control channel with respect to both uplink and downlink packet data communications.

24 Claims, 7 Drawing Sheets

SUPPORT OF MULTIPLE MODULATION LEVELS FOR A CELLULAR PACKET CONTROL CHANNEL

BACKGROUND OF THE INVENTION

1. Technical Field of the Invention

The present invention relates to the air interface of a cellular telephone network and, in particular, to an air interface of a cellular telephone network supporting a packet control channel for data communications.

2. Description of Related Art

The TIA/EIA Interim Standard IS-136 specified air interface of the digital advanced mobile phone service (D-AMPS) system separates the allocated cellular frequency spectrum into a plurality of thirty-kilohertz channels. Each channel is divided into 6.67 millisecond (ms) time slots, with three consecutive time slots forming a time division multiple access (TDMA) block. The modulation scheme used is differential quadrature phase shift keying (DQPSK), a relatively low-level modulation (LLM), with one-hundred sixty two symbols (of two bits each) per time slot.

Two types of channels are defined for the conventional air interface: the digital control channel (DCCH) and the digital traffic channel (DTC). The digital control channel is a multi-user channel that is used for controls and services such as registration, authentication, call set-up, and the like. The digital traffic channel is a circuit switched single user channel that is assigned at call set-up and handoff, and is used to handle a voice and/or data communication between users of the cellular system and users in a fixed or other cellular system. The D-AMPS standard supports full-rate, double-rate and triple-rate digital traffic channels for user data communications using one, two and three time slots per block, respectively,.

On the downlink over the D-AMPS air interface, every time slot, whether used for a digital control channel or a digital traffic channel, carries one-hundred thirty symbols of user information. This equates to a transfer of two-hundred sixty bits of user information every twenty milliseconds. Thus, each slot supports a communications rate of thirteen kilobits per second (kb/s). In practice, however, the actual information transfer rate is much less due to the inclusion of error protection bits. For example, voice traffic is transmitted over a full-rate digital traffic channel using approximately five kb/s of error protection for the approximately eight kb/s of digitized speech provided by a vocoder. For data traffic, on the other hand, the transmission over a full-rate thirteen kb/s digital traffic channel is made with a corresponding data rate of 9.6 kb/s.

The permitted data rates for voice and data communications over the digital traffic channel may be increased if double-rate or triple-rate traffic channels are used. The main difficulty or drawback with the use of multi-slot (i.e., multi-rate) operation is that the mobile stations which are being used for the communications utilize idle digital traffic channel time slots, where no communications over the air interface with the base station are being made, to make mobile assisted handoff (MAHO) measurements of the received signal strength from neighboring base stations. When configured for triple-rate voice or data communications, the mobile station is in essence communicating continuously, which leaves no time for making signal strength measurements. Frame stealing, wherein the mobile station interrupts communication for one or more time slots to make signal strength measurements, has been proposed as a possible solution to support multi-slot, and in particular triple-rate, communications. This is not a preferred solution as some communications data loss or interruption in communications continuity may occur.

A modification of the D-AMPS system has been proposed (referred to as D-AMPS+) which would enable higher rate communications without the need for multi-slot operation. For voice communications, a high-rate vocoder is used to provide higher quality digitized speech, and a high-level modulation (HLM) scheme providing more bits per transmitted symbol, such as sixteen level quadrature amplitude modulation (16-QAM), is then implemented on the digital traffic channel to increase the payload capable of being carried in each time slot. The use of high-level modulation is complementary to multi-slot operation to achieve the highest capacity in a radio channel of a given bandwidth. High-level modulation is thus preferred for a number of reasons. First, it preserves network capacity. Second, it minimizes power consumption in the mobile station, resulting in a longer talk time. Third, it facilitates conventional mobile station operation in making MAHO signal strength measurements during idle time slots. In summary, D-AMPS+ maintains the same air interface slot structure for circuit switched data as in D-AMPS, thus insuring backward compatibility, while simultaneously providing for higher throughput due to its support of a high-level modulation scheme.

An enhancement of the D-AMPS system has also been proposed which would facilitate the support of packet data communications over the air interface and compatibility with the cellular digital packet data (CDPD) network. In the enhanced D-AMPS system, two new types of packet data channels are provided. The first is a packet control channel (PCCH) which comprises a multi-user channel much like the previously described digital control channel (DCCH), and also used for controls and services such as registration, authentication, call set-up, and the like, as well as for the transmission of data packets. The second is a packet traffic channel (PTCH) comprising a single user channel much like the previously described digital traffic channel (DTC), again assigned at call set-up, and used to handle a packet data communication between users. The structure of these channels is very much like that of the D-AMPS channels, and the channels utilize the relatively low-level differential quadrature phase shift keying (DQPSK) modulation scheme. Again, multi-slot (up to three slots for triple-rate) operation of the channels is supported providing a maximum aggregate user payload of approximately thirty kb/s. Similar drawbacks as discussed above with respect to digital traffic channel multi-rate operation are encountered with multi-rate packet traffic channel operation.

The D-AMPS+ system discussed briefly above further proposes the carrying of higher rate data communications without the need for multi-slot operation on the packet channels. It is noted that because the packet control channel is a multi-user channel, it is impractical to adapt its modulation to every accessing mobile station. Accordingly, two different packet control channels are defined. The first is the enhanced D-AMPS specified, low-level modulation (LLM), differential quadrature phase shift keying (DQPSK) packet control channel. The second is a packet channel utilizing a high-level modulation (HLM) scheme such as sixteen level quadrature amplitude modulation (16-QAM). Similarly, a high-level modulation packet traffic channel is specified for use in addition to the enhanced D-AMPS specified low-level modulation packet traffic channel. Mobile stations capable of operation using only the low-level modulation scheme (i.e., enhanced D-AMPS only mobiles) are assigned to use the low-level modulation packet control channel and packet/digital traffic channels. D-AMPS+ mobile stations, on the other hand, may be assigned the high-level or low-level modulation packet control channel and packet/digital traffic channels depending on channel conditions (such as interference, bit error rate, word error rate, fading rate and the like).

For such D-AMPS+ mobile stations, a mechanism is needed for effectuating the selection of and a transition of operation between the low-level and high-level packet control/traffic channels with respect to packet data communications. The present invention provides such a mechanism for use in connection with the low/high-level modulation packet control channels.

SUMMARY OF THE INVENTION

In a D-AMPS+ cellular system, the communications air interface supports the conventional digital control channel and digital traffic channel. In addition, the air interface supports two packet data control channels (one high-level modulation and one low-level modulation) and two packet data traffic channels (again, one high-level modulation and one low-level modulation).

A procedure is provided for defining idle mobile station operation to select the high-level modulation or a low-level modulation packet channels to be used for packet data communication. In accordance with this selection procedure, the mobile station attempts an access (i.e., tuning to, synchronizing with and reading) on the high-level modulation packet control channel. If the access is successful, and signal quality is sufficient over a certain measurement period, the high-level modulation packet channels are selected. Otherwise, the low-level modulation packet channels are selected. The process for attempting high-level modulation packet control channel access and monitoring measured quality continues while the mobile station remains idle for the purposes of effectuating a re-selection, as needed, to the high or low-level modulation packet channels.

A plurality of procedures are further provided for defining system operation when a mobile station and base station are engaged in a data communication using the high or low-level modulation packet control channel. These procedures facilitate a fall-forward to the high-level modulation packet data control channel, or a fall-backward to the low-level modulation packet data control channel with respect to both uplink and downlink communications.

A first one of the procedures defines the process for having the mobile station and base station fall-forward from a low-level modulation packet data control channel to a high-level modulation packet data control channel for downlink data communications. The frame re-transmission rate and the bit error rate for the downlink data communications are monitored. If the monitored rates are acceptable over a minimum number of downlink data communications, a switch is made by the mobile station and base station to continue downlink data communications using the high-level modulation packet data control channel.

A second one of the procedures defines the process for having the mobile station and base station fall-forward from a low-level modulation packet data control channel to a high-level modulation packet data control channel for uplink data communications. The frame re-transmission rate and the bit error rate for the uplink data communications are monitored. If the monitored rates are acceptable over a minimum number of uplink data communications, a switch is made by the mobile station and base station to continue uplink data communications using the high-level modulation packet data control channel.

A third one of the procedures defines the process for having the mobile station and base station fall-backward from a high-level modulation packet data control channel to a low-level modulation packet data control channel for downlink data communications. In response to an unsuccessful downlink data communication on the high-level modulation packet data control channel, a retransmission is attempted. If a threshold number of retransmissions are attempted without success, the base station switches to communicate using the low-level modulation packet data control channel. In the meantime, the mobile station waits for a downlink data communication. With every received downlink data communication, a timer is reset. If the timer expires before a next downlink communication is received, the mobile station switches to receive further communications from the base station over the low-level modulation packet data control channel.

A fourth one of the procedures defines the process for having the mobile station and base station fall-backward from a high-level modulation packet data control channel to a low-level modulation packet data control channel for uplink data communications. In response to an unsuccessful uplink data communication on the high-level modulation packet data control channel, a retransmission is attempted. If a threshold number of retransmissions are attempted without success, the mobile station switches to communicate using the low-level modulation packet data control channel.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1A:
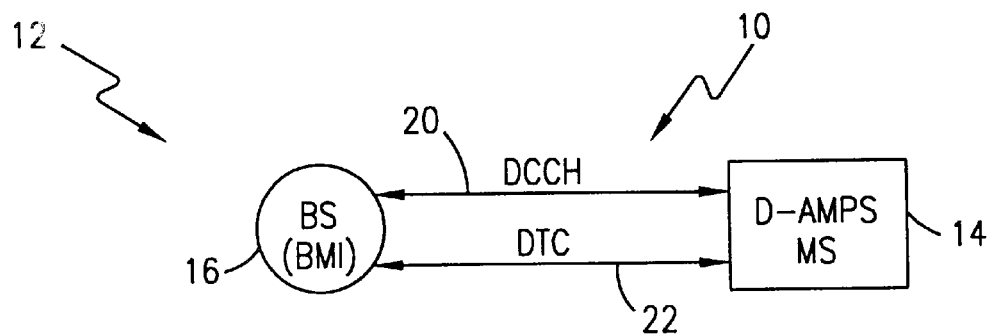
FIGS. 1A to 1C are block diagrams illustrating the channel content of the air interface in a digital advanced mobile phone service (D-AMPS) system, an enhanced D-AMPS system, and a D-AMPS+ system, respectively.

Reference is now made to FIG. 1A wherein there is shown a block diagram illustrating the channel content of the air interface 10 in a digital advanced mobile phone service (D-AMPS) system 12. The air interface 10 supports radio frequency voice and data communications between a mobile station 14 and a base station 16 (also referred to as a base station/mobile switching center/interworking unit (BMI)). Other components of the D-AMPS system 12 (like a base station controller, mobile switching center, home/visitor location center, and the like) are known to those skilled in the art, and are not shown in order to simplify the illustration. The D-AMPS system 12 air interface 10 conventionally supports two types of channels: the digital control channel (DCCH) 20 and the digital traffic channel (DTC) 22. The digital control channel 20 is a multi-user channel that is used for controls and services such as registration, authentication, call set-up, and the like. The digital traffic channel 22 is a single user channel that is assigned at call set-up and handoff, and is used to handle a voice and/or data communication between users. A relatively low-level modulation (LLM) scheme comprising differential quadrature phase shift keying (DQPSK) is used for communicating over either the digital control channel 20 or the digital traffic channel 22 (with one slot used for voice, and up to three slots used for data).

Figure 1B:
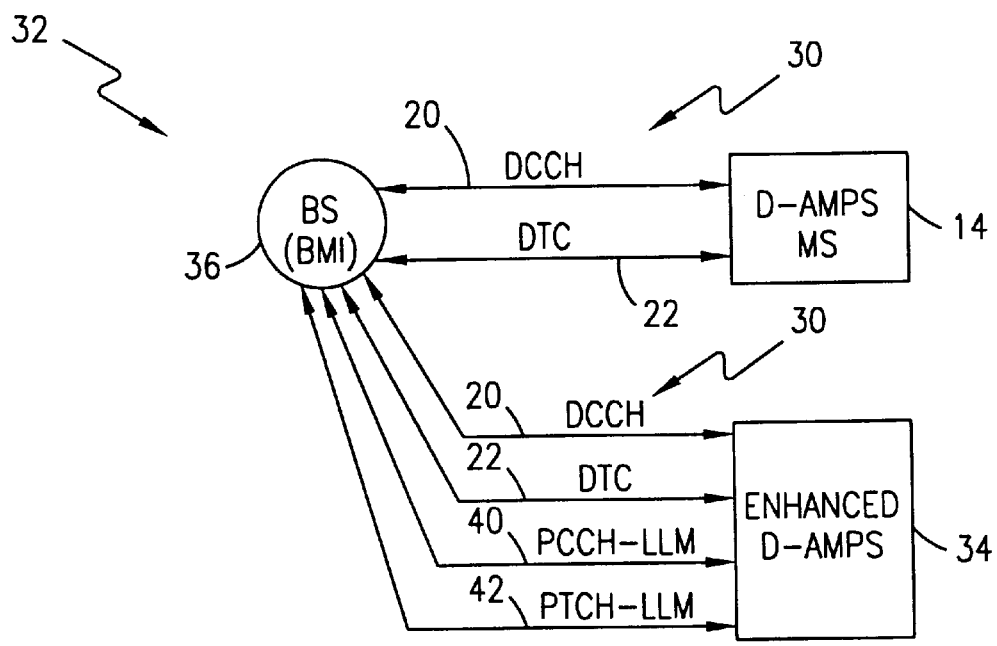

Reference is now made to FIG. 1B wherein there is shown a block diagram illustrating the channel content of the air interface 30 in an enhanced D-AMPS system 32. The air interface 30 supports radio frequency voice and data communications between a conventional D-AMPS mobile station 14 and/or a mobile station 34 and a base station 36 (also referred to as a base station/mobile switching center/interworking unit (BMI)). Other components of the enhanced D-AMPS system 32 (like a base station controller, mobile switching center, home/visitor location center, and the like) are known to those skilled in the art, and are not shown in order to simplify the illustration. The enhanced D-AMPS system 32 air interface 30 supports the conventional D-AMPS channels comprising the digital control channel (DCCH) 20 and the digital traffic channel (DTC) 22 (described above), as well as a packet control channel (PCCH) 40 and a packet traffic channel (PTCH) 42. The packet control channel 40 is a multi-user channel that is used for controls and services such as registration, authentication, call set-up, and the like, and is further used for the transmission of data packets. The packet traffic channel 42 is a single user channel that may be allocated for use when packet data transmission is needed and then used to handle a packet data communication between users. As with the conventional D-AMPS channels 20 and 22, the structure of the enhanced packet control and packet traffic channels 40 and 42 utilizes a relatively low-level modulation (LLM) scheme comprising differential quadrature phase shift keying (DQPSK).

Figure 1C:
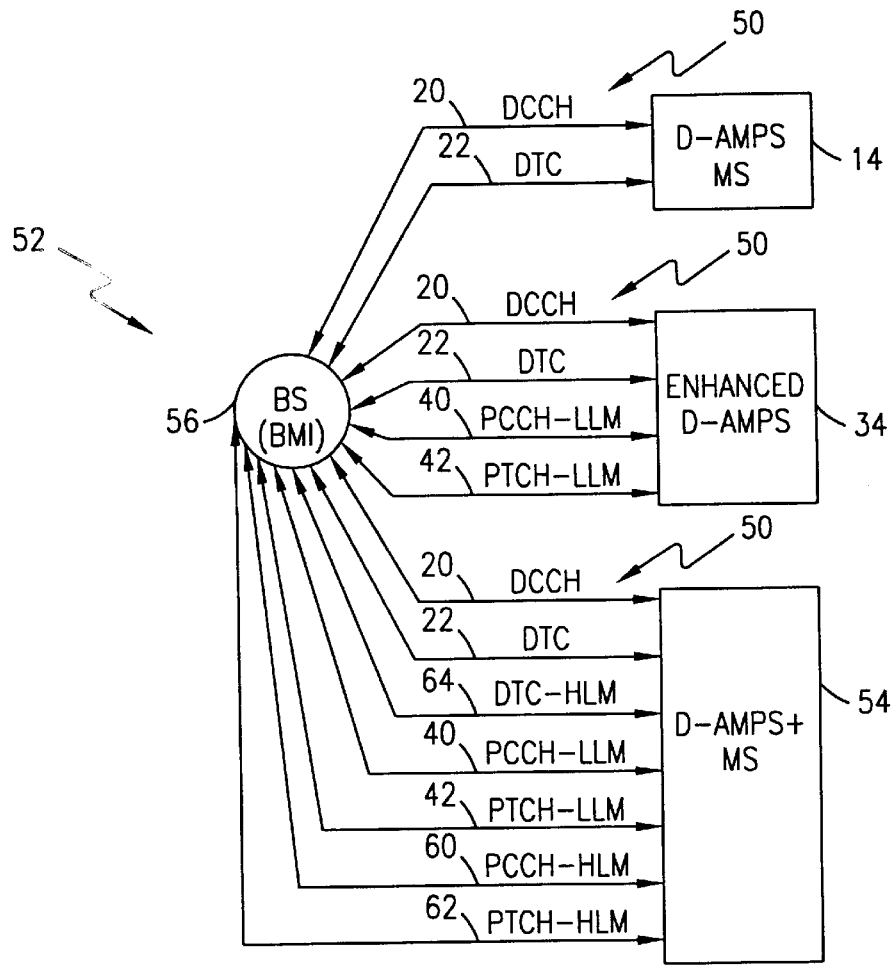

Reference is now made to FIG. 1C wherein there is shown a block diagram illustrating the channel content of the air interface 50 in a D-AMPS+ system 52. The air interface 50 supports radio frequency voice and data communications between a conventional D-AMPS mobile station 14, a mobile station 34 and/or a D-AMPS+ mobile station 54 and a base station 56 (also referred to as a base station/mobile switching center/interworking unit (BMI)). Other components of the D-AMPS+ system 52 (like a base station controller, mobile switching center, home/visitor location center, and the like) are known to those skilled in the art, and are not shown in order to simplify the illustration. The D-AMPS+ system 52 air interface 50 supports the conventional D-AMPS channels comprising the low-level modulation digital control channel (DCCH) 20 and the low-level modulation digital traffic channel (DTC) 22 (described above), and the enhanced D-AMPS low-level modulation (LLM) packet control channel (PCCH) 40 and low-level modulation packet traffic channel (PTCH) 42 (as described above), as well as a packet control channel (PCCH) 60, a packet traffic channel (PTCH) 62 and a digital traffic channel (DTC) 64. The packet control channel 60 is a multi-user channel that is used for controls and services such as registration, authentication, call set-up, and the like, and is also used for packet data transmissions. The packet traffic channel 62 is a single user channel that may be allocated for use when packet data transmission is needed and then used to handle a packet data communication between users. The digital traffic channel 64 is also a multi-user channel that is circuit switched and used for voice communications between users. Unlike the conventional D-AMPS or enhanced D-AMPS channels 20, 22, 40 and 42, the structure of the D-AMPS+ packet control and packet traffic channels 60 and 62, and digital traffic channel 64, utilizes a relatively high-level modulation (HLM) scheme comprising, for instance, sixteen level quadrature amplitude modulation (16-QAM) or eight level phase shift keying (8-PSK).

A mobile station capable of operation using only the low-level modulation (LLM) scheme (comprising, for example, the conventional D-AMPS mobile station 14 or the enhanced D-AMPS mobile station 34), uses only the low-level modulation for communications over the digital control channel 20, digital traffic channel 22, packet control channel 40 or packet traffic channel 42. A D-AMPS+ mobile station 54, on the other hand, may selectively utilize either low-level modulation or high-level modulation. For communications using the digital control channel 20, only low-level modulation is supported by the air interface 50 and hence is used by the mobile station 54 and base station 56. For communications over either the packet control channels 40 or 60 or packet traffic channels 42 or 62, or the digital traffic channels 22 or 64, however, both low-level modulation and high-level modulation is supported by the air interface 50. Thus, the mobile station 54 and/or base station 56 may selectively choose, and if necessary switch among and between, low-level modulation and high-level modulation for its packet data communications depending on a number of factors including channel conditions (such as interference, bit error rate, word error rate, fading rate and the like).

In any event, operation of the system using the high-level modulation for data communications (uplink or downlink, control or traffic, circuit or packet) is preferred because of its inherent relative efficiencies and better performance. The high-level modulation scheme requires a higher channel quality though and is thus more sensitive to channel degradation and mobile station speed. Accordingly, appropriate procedures must be implemented to give preference to operation in high-level modulation, while at the same time supporting low-level modulation operation, and dynamic change between low and high, when channel conditions so warrant.

Figure 2A:
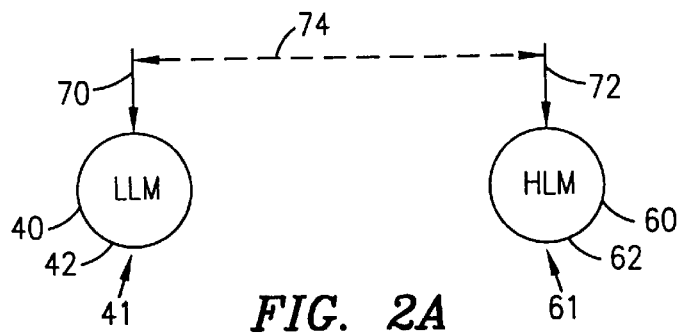
FIGS. 2A and 2B are state transition diagrams illustrating D-AMPS+ mobile station operation using low-level modulation or high-level modulation for packet control channel communications.
Figure 2B:
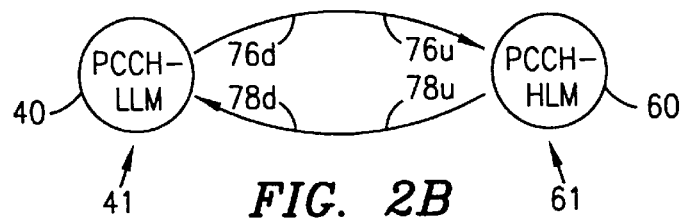

Reference is now made to FIGS. 2A and 2B wherein there is shown a state transition diagram illustrating D-AMPS+ mobile station 54 and base station 56 operation using low-level modulation or high-level modulation for packet channel 40, 42, 60 or 62 communications. Referring first to FIG. 2A, the procedure assumes that the mobile station 54 is in idle mode, and starts with the mobile station selecting 70 low-level modulation 41 using the packet control channel (PCCH-LLM) 40 and packet traffic channel (PTCH-LLM) 42 or selecting 72 high-level modulation 61 using the packet control channel (PCCH-HLM) 60 or packet traffic channel (PTCH-HLM) 62. Assuming now that the mobile station 54 has selected 70 or 72 either low-level modulation 41 or high-level modulation 61, while continuing operation in idle mode the mobile station may engage in a re-selection 74 to the other one of the modulations 41 or 61 if conditions, such as channel quality, so warrant.

Referring next to FIG. 2B, it is now assumed that a packet control channel data communication is underway (on either the uplink or the downlink) between the mobile station 54 and the base station 56. If the communication currently utilizes the low-level modulation 41 packet control channel 40, a fall-forward state change 76d (downlink) or 76u (uplink) in the event channel quality is good may occur switching mobile station 54 and base station 56 operation with respect to continued data communication to the high-level modulation 61 packet control channel 60. Alternatively, if the communication utilizes the high-level modulation 61 packet control channel 60, a fall-backward state change 78d (downlink) or 78u (uplink) in the event channel quality degrades may occur switching mobile station 54 and base station 56 operation to the low-level modulation 41 packet control channel 40. with respect to any given uplink or downlink packet control channel data communication, the packet data communication between the mobile station 54 and base station 56 may fall-backward 76 or fall-forward 78 between low-level modulation 41 and high-level modulation 61 as often as is necessary (within certain operator specified constraints) in view of conditions, such as channel quality, to insure efficient and effective data communication.

Figure 3:
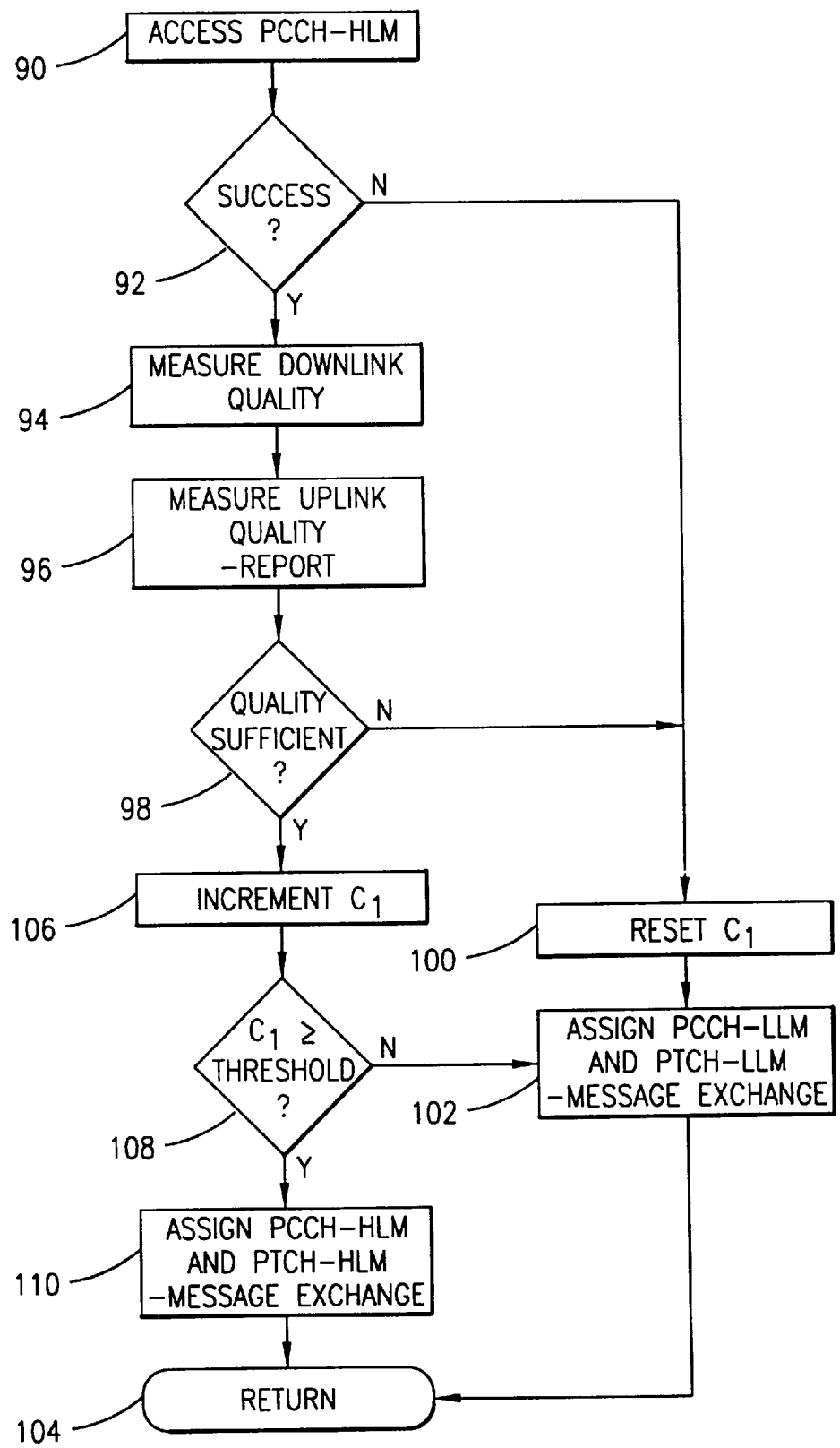
FIG. 3 is a flow diagram illustrating the process for D-AMPS+ mobile station selection and re-selection of a packet control channel.

Reference is now made to FIG. 3 wherein there is shown a flow diagram illustrating the process for D-AMPS+ mobile station 54 selection 70 or 72 and re-selection 74 of low-level modulation 41 or high-level modulation 61, respectively, as in FIG. 2A. In step 90, the mobile station 54 tries to access (i.e., tune to, synchronize with and read) the high-level modulation packet control channel (PCCH-HLM) 60. If this access is successful, as determined by decision step 92, the mobile station 54 makes a downlink signal quality measurement on the high-level modulation packet control channel 60 (step 94). Optionally, at or about the same time, the mobile station may transmit uplink on the high-level modulation packet control channel 60 to enable the base station 56 to make an uplink signal quality measurement (step 96). These base station 56 measurements, if made, are then reported back to the mobile station 54. The quality characteristics measured by the mobile station 54 (and optionally the base station 56) include: signal strength, bit error rate, word error rate, fading rate and carrier-to-interference ratio. A determination is then made in decision step 98 as to whether the signal quality uplink and downlink is sufficient for packet data communications. If either the access of step 90 was unsuccessful (see, step 92), or the determined signal quality uplink or downlink is insufficient for packet data communications (see, step 98), a counter $C_1$ is reset in step 100. Operation in low-level modulation 41 mode using the packet control channel (PCCH-LLM) 40 and packet traffic channel (PTCH-LLM) 42 is then assigned for selection 70 or re-selection 74 in step 102. If the mobile station 54 has just previously been assigned to the high-level modulation 61 mode (i.e., this is a re-selection 74), the assignment of step 102 involves the exchange of messages with the base station 56 to effectuate and confirm the re-selection 74. The process then returns in step 104 back to step 90 to repeat the entire procedure over again. If, alternatively, the determined signal quality uplink and downlink is sufficient for packet data communications (see, step 98), the counter $C_1$ is incremented in step 106. A determination is then made in decision step 108 as whether the counter $C_1$ value exceeds a certain counter threshold. If the counter $C_1$ does not exceed the threshold, low-level modulation 41 operation is assigned using the packet control channel 40 and packet traffic channel 42 in step 102. Again, if the mobile station 54 has just previously been assigned to the high-level modulation 61 mode (i.e., this is a re-selection 74), the assignment of step 102 involves the exchange of messages with the base station 56 to effectuate and confirm the re-selection 74. The process then returns in step 104 back to step 90 to repeat the entire procedure again. If, instead, the counter $C_1$ does exceed the threshold (see, step 108), operation in high-level modulation 61 mode using packet control channel 60 and packet traffic channel 62 is assigned for selection 72 or re-selection 74 in step 110. If the mobile station 54 has just previously been assigned to the low-level modulation 41 mode (i.e., this is a re-selection 74), the assignment of step 110 involves the exchange of messages with the base station 56 to effectuate and confirm the re-selection 74. The process then returns in step 104 back to step 90 to repeat the entire procedure over again.

In packet control or traffic data communications, a single transaction relating to a data communication involves the transmission of a plurality of packets. Each individual packet forms a single OSI model layer 3 message. Transmission of that single layer 3 message requires the use of a plurality of OSI model layer 2 frames. If a low-level modulation (LLM) scheme such as differential quadrature phase shift keying (DQPSK) is used, a certain number x of layer 2 frames are needed for each single layer 3 message. If, on the other hand, a high-level modulation (HLM) scheme such as sixteen level quadrature amplitude modulation (16-QAM) is used, a certain number y of layer 2 frames (wherein y<x) are needed for each single layer 3 message. In instances where a layer 3 message is sent in high-level modulation using y layer 2 frames, delivery fails, and a decision is then made to use low-level modulation, the layer 3 message must be resegmented into the x layer 2 frames and completely resent in low-level modulation. A complete retransmission is required because the beginnings and ends of the x and y individual layer 2 frames comprising the layer 3 message do not necessarily correspond with each other. This is valid for both uplink and downlink transmissions.

Figure 4:
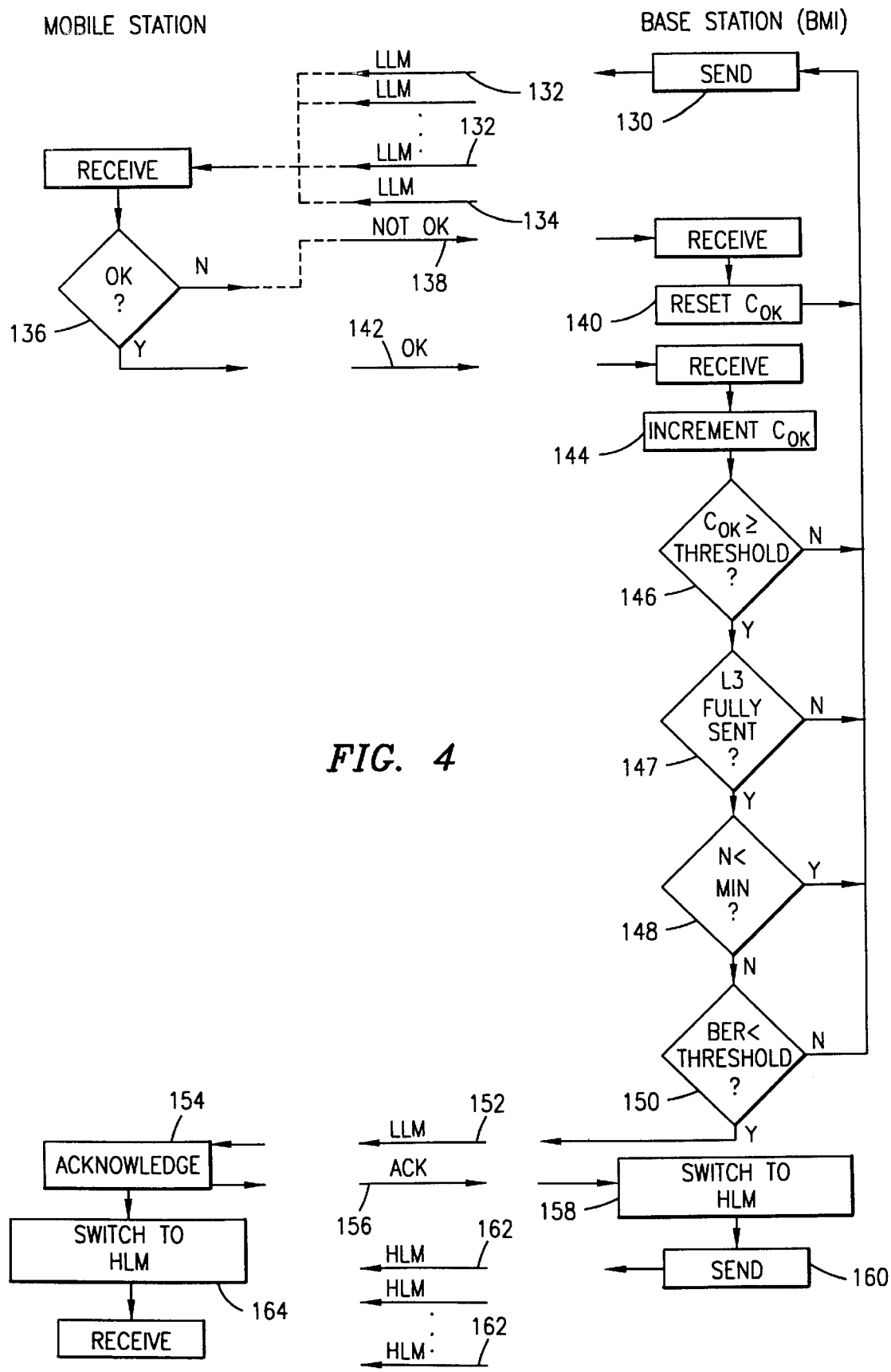
FIG. 4 is a flow diagram illustrating, in the context of an ongoing downlink packet control channel data communication, D-AMPS+ system operation to perform a fall-forward operation.

Reference is now made to FIG. 4 wherein there is shown a flow diagram illustrating, in the context of an ongoing downlink packet control channel data communication, D-AMPS+ system operation to perform a fall-forward operation 76d of FIG. 2B. In step 130, the base station 56 (also referred to as a base station/mobile switching center/interworking unit (BMI)) consecutively sends a plurality of frames 132 within a given layer 3 message over the low-level modulation packet control channel (PCCH-LLM) 40, and then polls 134 the mobile station 54 regarding the success of the transmission. If the sent plurality of frames were not correctly received (as determined in step 136) by the mobile station 54, the mobile station transmits a status "Not OK" message 138 to the base station 56 back over the low-level modulation packet control channel 40. If the base station 56 receives the status "Not OK" message 138, indicative of failed mobile station reception of one or more of the plurality of frames 132, or if no message 138 is received at all, a counter $C_{OK}$ is reset in step 140. The procedure then returns to resend 130 the incorrectly received ones of the frames 132. If, on the other hand, the sent plurality of frames were correctly received (as determined in step 136) by the mobile station 54, the mobile station transmits a status "OK" message 142 to the base station 56 back over the low-level modulation packet control channel 40. The status "OK" message 142 further includes a value indicative of the average bit error rate on the downlink for the previously sent 130 plurality of frames 132. If the base station 56 receives the status "OK" message 142, indicative of correct transmission and reception of the plurality of frames 132, a counter $C_{OK}$ is incremented in step 144. The counter $C_{OK}$ is then compared to a threshold in decision step 146. If the counter $C_{OK}$ does not meet or exceed the threshold as determined in step 146, the procedure returns to send 130 a next plurality of frames 132 within the given or another layer 3 message. If, however, the counter $C_{OK}$ does meet or exceed the threshold, a determination is made in decision step 147 as to whether the last layer 3 message was sent completely (i.e., have all of the frames of the message been sent and received). If not, the procedure returns to step 130 to send the remainder of the frames within the layer 3 message. If so, on the other hand, the procedure then determines in decision step 148 whether the number of frames N in the one or more layer 3 messages remaining to be transmitted to the mobile station is less than a certain minimum. If so, the procedure returns to send 130 a remaining plurality of frames 132 within the remaining layer 3 messages. If, however, the remaining number of frames meets or exceeds the minimum, a determination is made in step 150 as to whether the average bit error rate (BER) reported in the status "OK" message 142 is less than a given threshold. If not, the procedure returns to send 130 a remaining plurality of frames 132 within the remaining layer 3 messages. If, however, the average bit error rate is less than the given threshold, the base station 56 sends a fall-forward command message 152 to the mobile station 54 using low-level modulation. This command is then acknowledged in step 154 by the mobile station 54 with an appropriate message 156. In response to the acknowledgment message 156, the base station switches to the high-level modulation packet control channel (PCCH-HLM) 60 in step 158, and begins consecutively sending 160 a next plurality of frames 162 within the remaining layer 3 messages using the high-level modulation scheme. In the meantime, the mobile station 54 has also switched to the high-level modulation packet control channel 60 in step 164, and is awaiting reception of the base station 56 packet data transmissions.

Figure 5:
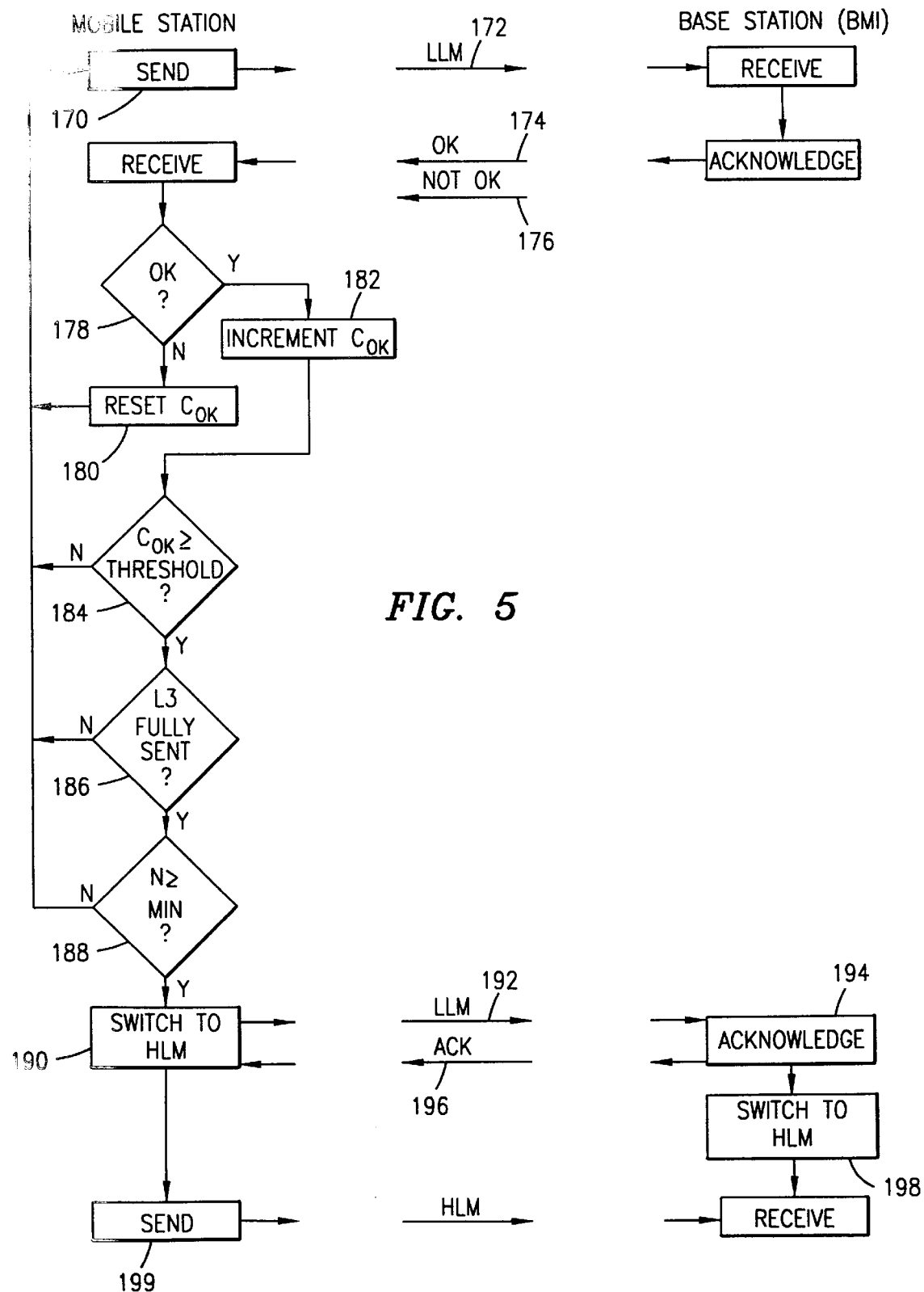
FIG. 5 is a flow diagram illustrating, in the context of an ongoing uplink packet control channel data communication, D-AMPS+ system operation to perform a fall-forward operation.

Reference is now made to FIG. 5 wherein there is shown a flow diagram illustrating, in the context of an ongoing uplink packet control channel data communication, D-AMPS+ system operation to perform a fall-forward operation 76u as in FIG. 2B. In step 170, the mobile station 54 sends a single frame 172 within a given layer 3 message over the low-level modulation packet control channel (PCCH-LLM) 40. In response to a correct reception of the transmitted frame 172, the base station 56 (also referred to as a base station/mobile switching center/interworking unit (BMI) ) transmits a shared channel feedback status "OK" message 174 back to the mobile station 54 over the low-level modulation packet control channel 40. Otherwise, a shared channel feedback status "Not OK" message 176 is sent. If the mobile station 54 receives the status "Not OK" message 176, or fails to receive any status message, as determined by decision step 178, this is indicative of an incorrect reception of the frame 172. A counter $C_{OK}$ is then reset in step 180. The procedure then returns to step 170 to resend the incorrectly received frame. Otherwise, the counter is incremented in step 182. The counter $C_{OK}$ is then compared to a threshold in decision step 184. If the counter $C_{OK}$ does not meet or exceed the threshold, the procedure returns to send 170 a next frame 172 within the given layer 3 message. If, however, the counter $C_{OK}$ does meet or exceed the threshold, a determination is made in decision step 186 as to whether the last layer 3 message was sent completely (i.e., have all of the frames of the message been sent and received). If not, the procedure returns to step 130 to send the remainder of the frames within that layer 3 message. If so, on the other hand, the procedure then determines in decision step 188 whether the number of frames N in the layer 3 messages remaining to be transmitted to the base station meets or exceeds a certain minimum. If not, the procedure returns to send 170 a remaining plurality of frames 172 within the remaining layer 3 messages. If, however, the remaining number of frames meets or exceeds the minimum, the mobile station switches to high-level modulation packet control channel 60 in step 190 and sends a fall-forward command message 192 to the base station 56 using low-level modulation. This command is then acknowledged in step 194 by the base station 56 with an appropriate message 196. In response to the message 192, the base station switches to the high-level modulation packet control channel (PCCH-HLM) 60 in step 198. The mobile station 54 then sends 199 a next frame to the base station 56 over the high-level modulation packet control channel 60.

Although FIGS. 4 and 5 illustrate procedures for fall-forward with respect to a downlink and an uplink packet data communication, respectively, it will, of course, be understood that alternatively the fall-forward process may be effectuated through the use of the re-selection 74 procedure of FIG. 3. In such cases, operation in low-level modulation 41 would continue until the packet data communication terminated and the mobile station re-entered idle mode. At that point, the re-selection 74 and change to high-level modulation 61 may take place.

Figure 6:
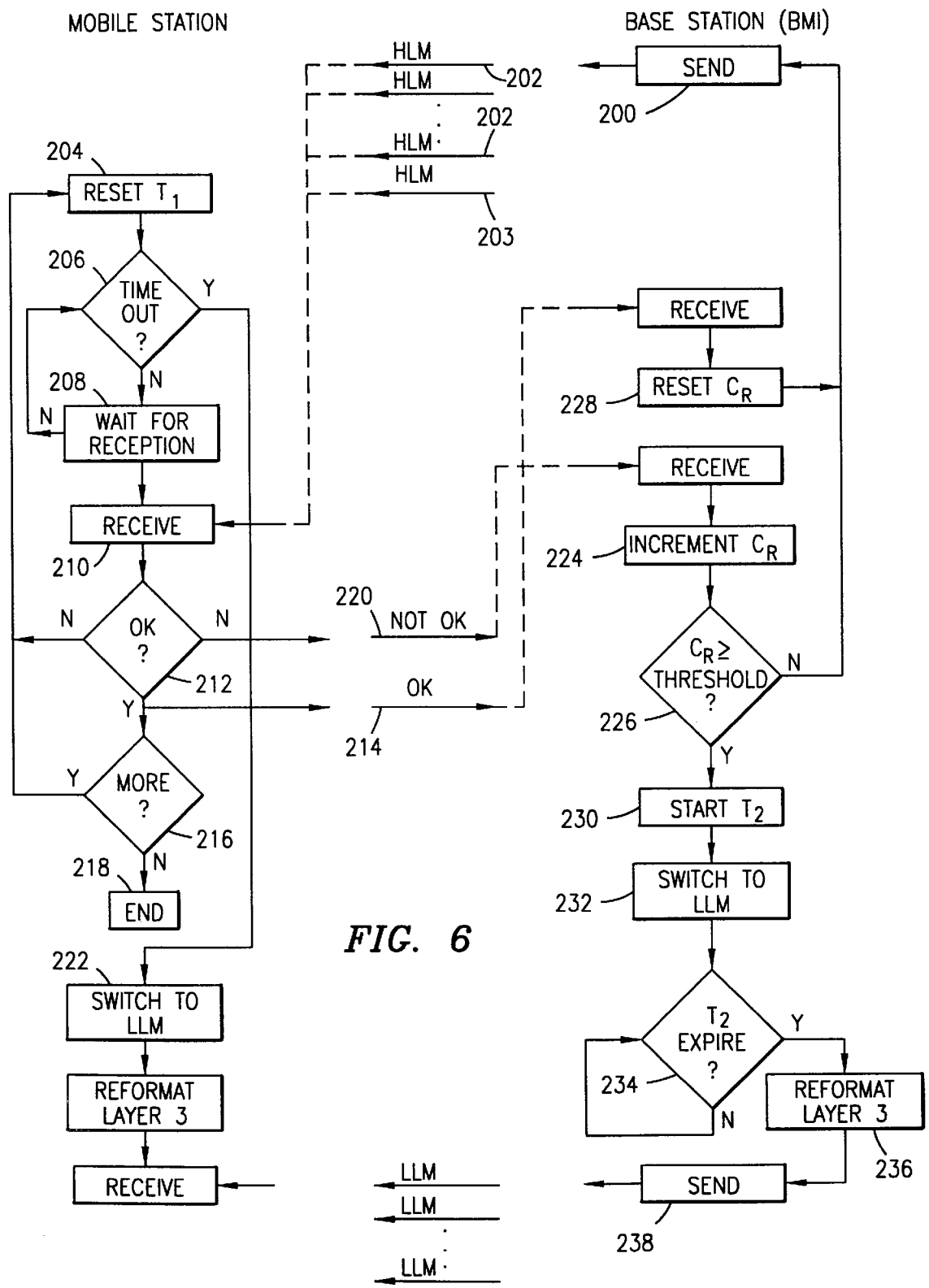
FIG. 6 is a flow diagram illustrating, in the context of an ongoing downlink packet control channel data communication, D-AMPS+ system operation to perform a fall-backward operation.

Reference is now made to FIG. 6 wherein there is shown a flow diagram illustrating, in the context of an ongoing downlink packet control channel data communication, D-AMPS+ system operation to perform a fall-backward operation 78d as in FIG. 2B. In step 200, the base station 56 (also referred to as a base station/mobile switching center/interworking unit (BMI)) consecutively sends a plurality (certain number) of frames 202 within a given layer 3 message over the high-level modulation packet control channel (PCCH-HLM) 60, and then polls 203 the mobile station 54 regarding the success of the transmission. In the meantime, a mobile station is awaiting reception of the frames, resets and starts a timer $T_1$ in step 204. A comparison of the timer $T_1$ value to a time out value is then made in step 206. If the timer $T_1$ value is less than the time out value, the mobile station 54 continues to wait in step 208 for the base station transmission 200 of the plurality of frames 202. If the frames 202 are subsequently received 210 before the timer $T_1$ exceeds the time out value, and the frames are correctly received as determined in decision step 212, the mobile station responds to the polling message 203 with a status "OK" message 214 sent back to the base station 56 over the high-level modulation packet control channel 60. A determination is then made in step 216 as to whether more frames are expected to be received. If so, the mobile station procedure returns to reset the value of the timer $T_1$ in step 204. Otherwise, the procedure ends in step 218. If, however, any one of the sent plurality of frames was not correctly received by the mobile station 54 as determined in step 212, the mobile station transmits a status "Not OK" message 220 back to the base station 56 over the high-level modulation packet control channel 60. The procedure further returns to await re-transmission of those frames, and the value of the timer $T_1$ is reset in step 204. If the timer $T_1$ exceeds the time out value before receiving an expected frame or frames, the mobile station 54 switches to the low-level modulation packet control channel (PCCH-LLM) 40 in step 222, and waits for base station 56 low-level modulation frame transmission. Any necessary actions may also be taken at that time to account for the reformatting of the layer 3 message for low-level modulation transmission. For example, if only a portion of a given layer 3 message was successfully received, it will have to be completely retransmitted, and thus the mobile station may dispose of the previously received portion.

In response to receipt of the status "OK" message 214, the base station procedure returns to send 200 a next plurality of frames 202 within another layer 3 message. If the base station 56 instead receives the status "Not OK" message 220, or fails to receive any message from the mobile station at all, a failure of the communication is assumed. A counter $C_R$ is incremented in step 224, and compared to a threshold in step 226. If the counter $C_R$ value is less than the threshold, the base station 56 returns to resend 200 the incorrectly received ones of the previously sent plurality of frames 202. If a status "OK" message 214 is thereafter received by the base station 56, the counter $C_R$ is reset in step 228, and the procedure returns to send 200 a next plurality of frames 202 within another layer 3 message. If the counter $C_R$ value meets or exceeds the threshold, the base station 56 starts a timer $T_2$ in step 230, and switches to the low-level modulation packet control channel 40 in step 232. The value of the timer $T_2$ is set to give the mobile station 54 a sufficient opportunity to make the switch over to the low-level modulation packet control channel 40 (see, step 222). When the timer $T_2$ expires as determined in step 234, the base station 56 reformats 236 the failed layer 3 message for low-level modulation transmission and sends 238 (step 130 of FIG. 4) the plurality of frames thereof over the low-level modulation packet control channel 40.

Figure 7:
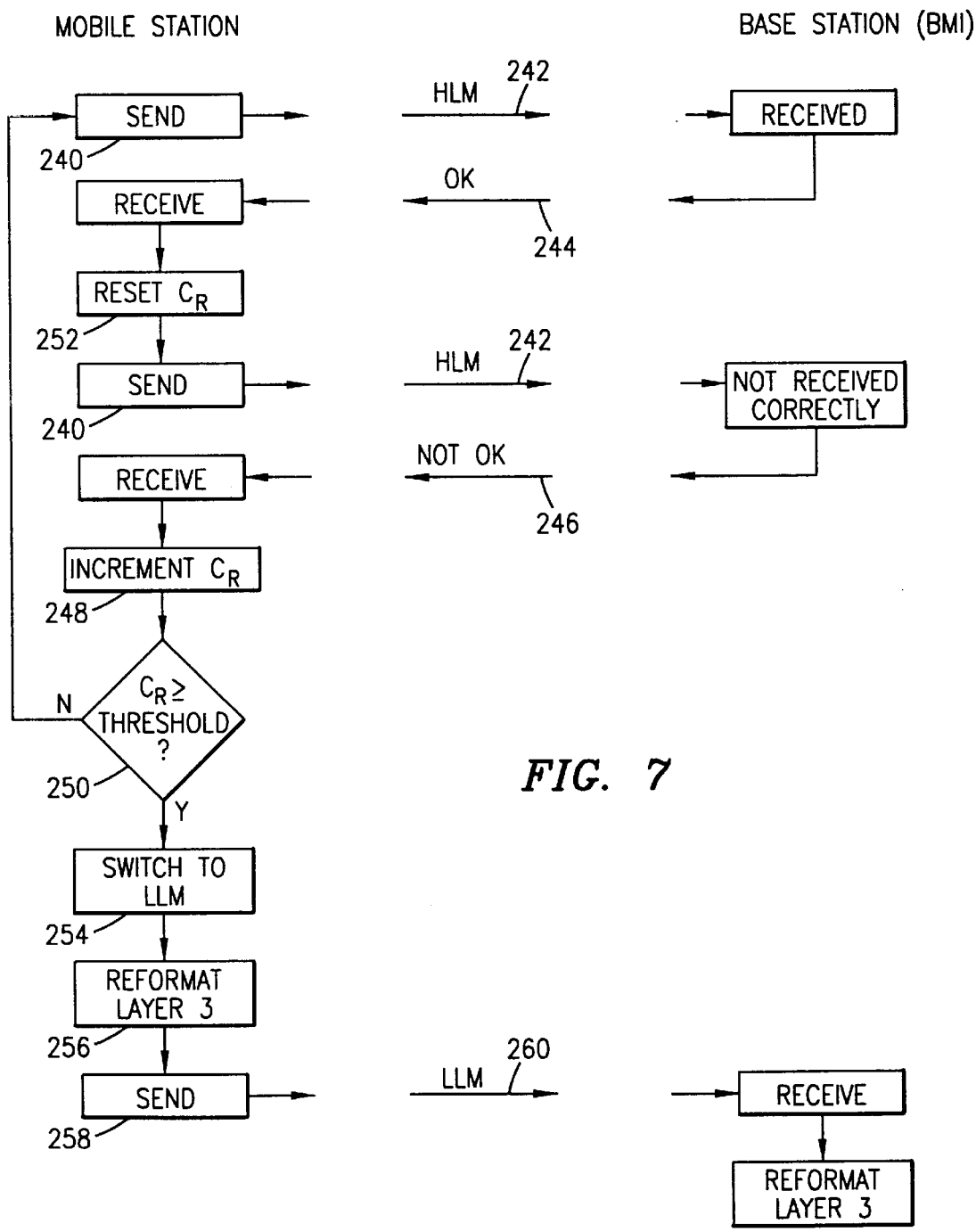
FIG. 7 is a flow diagram illustrating, in the context of an ongoing uplink packet control channel data communication, D-AMPS+ system operation to perform a fall-backward operation.

Reference is now made to FIG. 7 wherein there is shown a flow diagram illustrating, in the context of an ongoing uplink packet control channel data communication, D-AMPS+ system operation to perform a fall-backward operation 78u. In step 240, the mobile station 54 sends a single frame 242 within a given layer 3 message over the high-level modulation packet control channel (PCCH-HLM) 60. In response to a correct reception of the transmitted frame 242, the base station 56 (also referred to as a base station/mobile switching center interworking (BMI) unit) transmits a shared channel feedback status "OK" message 244 back to the mobile station 54 over the high-level modulation packet control channel 60. The mobile station then sends a next single frame 242 within the given layer 3 message to the base station 56. If the frame 242 is not received correctly, the base station 56 transmits a shared channel feedback status "Not OK" message 246 back to the mobile station 54. In response thereto, or in response to a failure to receive the shared channel feedback status message 244 or 246, a counter $C_R$ is incremented by the mobile station 54 in step 248, and compared to a threshold in step 250. If the counter $C_R$ does not meet or exceed the threshold, the procedure returns to resend 240 the incorrectly transmitted and received frame 242. If the frame 242 should thereafter be correctly received, and a shared channel feedback status "OK" message 244 is received by the mobile station 54, the counter $C_R$ is reset in step 252. When the counter $C_R$ meets or exceeds the threshold, the mobile station 54 switches to the low-level modulation packet control channel (PCCH-LLM) 40 in step 254. The layer 3 message is then reformatted in step 256 for low-level modulation transmission. The procedure then sends 258 a frame 260 of the reformatted message over the low-level modulation packet control channel 40. The base station 56 then waits to receive the low-level modulation frame transmission. Any necessary actions may also be taken by the base station at that time to account for the reformatting of the layer 3 message for low-level modulation transmission. For example, if only a portion of a given layer 3 message was successfully received in high-level modulation, it will have to be completely retransmitted, and thus the base station may dispose of any previously received portion.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a mobile communications system having an air interface supporting a low-level modulation packet control channel and packet traffic channel and further supporting a high-level modulation packet control channel and packet traffic channel, a method for packet channel selection by an idle mobile station, comprising the steps of:

attempting to access the high-level modulation packet control channel;

if the access is successful, measuring communications quality on the high-level modulation packet control channel;

determining if the measured communications quality is sufficient for data communications; and if so, assigning the high-level modulation packet control channel and the high level modulation packet traffic channel as the selected packet channels for the mobile station.

2. The method as in claim 1 wherein the step of measuring communications quality comprises the step of measuring both uplink and downlink communications quality.

3. The method as in claim 1 wherein the step of determining if the measured communications quality is sufficient further includes the step of confirming a continuity of sufficient measured communications quality before assigning the high-level modulation packet control channel and packet traffic channel as the selected packet channels for the mobile station.

4. The method as in claim 1 wherein the step of assigning the high-level modulation packet control channel and packet traffic channel as the selected packet channels for the mobile station further comprises the step of exchanging messages with a base station confirming selection of the high-level modulation packet channels.

5. The method as in claim 1 further including the step of assigning the low-level modulation packet control channel and packet traffic channel as the selected packet channels for the mobile station if either: the access of the high-level modulation packet control channel is unsuccessful; or the determined measured communications quality is insufficient.

6. The method as in claim 1 further comprising the step of repeating the steps of claim 1 following an initial selection of either the high-level modulation packet channels or the low-level modulation packet channels to perform a re-selection of either the high-level modulation packet channels or the low-level modulation packet channels.

7. In a mobile communications system having an air interface supporting a low-level modulation packet control channel and a high-level modulation packet control channel, a method for downlink packet control channel data communications fall-forward, comprising the steps of:

downlink sending of a plurality of communications frames over the low-level modulation packet control channel;

responsive to a correct reception of the sent plurality of communications frames, incrementing a counter;

comparing the counter to a threshold;

downlink sending of a command to switch to the high-level modulation packet control channel if the counter meets or exceeds the threshold;

switching to the high-level modulation packet control channel; and downlink sending of a plurality of communications frames over the high-level modulation packet control channel.

8. The method as in claim 7 further including the step of confirming sufficient communications quality for data communications before sending the command to switch to the high-level modulation packet control channel.

9. The method as in claim 8 wherein the communications frames are a portion of a message, and further including the step of checking if the message has been completely sent before sending the command to switch to the high-level modulation packet control channel.

10. The method as in claim 9 wherein the message is a part of a communications transaction, and further including the step of identifying a number of frames remaining for transmission in the transaction.

11. The method as in claim 10 further including the step of continuing transmission of the plurality of communications frames over the low-level modulation packet control channel if either: the counter does not meet or exceed the threshold; the communications quality is insufficient; the message has not been completely sent; or the number of frames is less than a threshold.

12. In a mobile communications system having an air interface supporting a low-level modulation packet control channel and a high-level modulation packet control channel, a method for uplink packet control channel data communications fall-forward, comprising the steps of:

uplink sending of a communications frame over the low-level modulation packet control channel;

responsive to a correct reception of the sent communications frame, incrementing a counter;

comparing the counter to a threshold;

switching to the high-level modulation packet control channel if the counter meets or exceeds the threshold; and uplink sending of a communications frame over the high-level modulation packet control channel.

13. The method as in claim 12 further including the step of attempting a retransmission of the communications frame over the low-level modulation packet control channel if the counter does not meet or exceed the threshold.

14. The method as in claim 12 wherein the communications frame is a portion of a message, and the step of uplink sending over the high-level modulation packet control channel comprises the step of sending the message.

15. The method as in claim 12 wherein the communications frame is a portion of a message, and further including the step of checking if the message has been completely sent before switching to the high-level modulation packet control channel.

16. The method as in claim 15 wherein the message is a part of a communications transaction, and further including the steps of:

identifying a number of frames remaining for transmission in the transaction; and switching to the high level modulation packet control channel is the number exceeds a threshold.

17. In a mobile communications system having an air interface supporting a low-level modulation packet control channel and a high-level modulation packet control channel, a method for downlink packet control channel data communications fall-backward, comprising the steps of:

downlink sending of a plurality of communications frames over the high-level modulation packet control channel;

responsive to an incorrect reception of the sent plurality of communications frames, incrementing a counter;

comparing the counter to a threshold;

switching for transmission to the low-level modulation packet control channel if the counter meets or exceeds the threshold; and downlink sending of a plurality of communications frames over the low-level modulation packet control channel.

18. The method as in claim 17 further including the step of attempting a retransmission of the plurality of communications frames over the high-level modulation packet control channel if the counter does not meet or exceed the threshold.

19. The method as in claim 17 further including the steps of:

starting a timer;

waiting for reception of the plurality of communications frames;

determining if the timer has timed out without receiving any frames; and switching to the low-level modulation packet control channel if the timer has timed out.

20. The method as in claim 19 wherein:

the steps of claim 17 are performed by an origination source of the plurality of communications frames sent on the downlink; and the steps of claim 19 are performed by a reception destination of the plurality of communications frames sent on the downlink.

21. The method as in claim 17 wherein the plurality of communications frames are a portion of a message, and the step of downlink sending over the low-level modulation packet control channel comprises the step of resending the message.

22. In a mobile communications system having an air interface supporting a low-level modulation packet control channel and a high-level modulation packet control channel, a method for uplink packet control channel data communications fall-backward, comprising the steps of:

uplink sending of a communications frame over the high-level modulation packet control channel;

responsive to a incorrect reception of the sent communications frame, incrementing a counter;

comparing the counter to a threshold;

switching to the low-level modulation packet control channel if the counter meets or exceeds the threshold; and uplink sending of a communications frame over the low-level modulation packet control channel.

23. The method as in claim 22 further including the step of attempting a retransmission of the communications frame over the high-level modulation packet control channel if the counter does not meet or exceed the threshold.

24. The method as in claim 22 wherein the communications frame is a portion of a message, and the step of uplink sending over the low-level modulation packet control channel comprises the step of resending the message.

* * * * *